Patented July 30, 1935

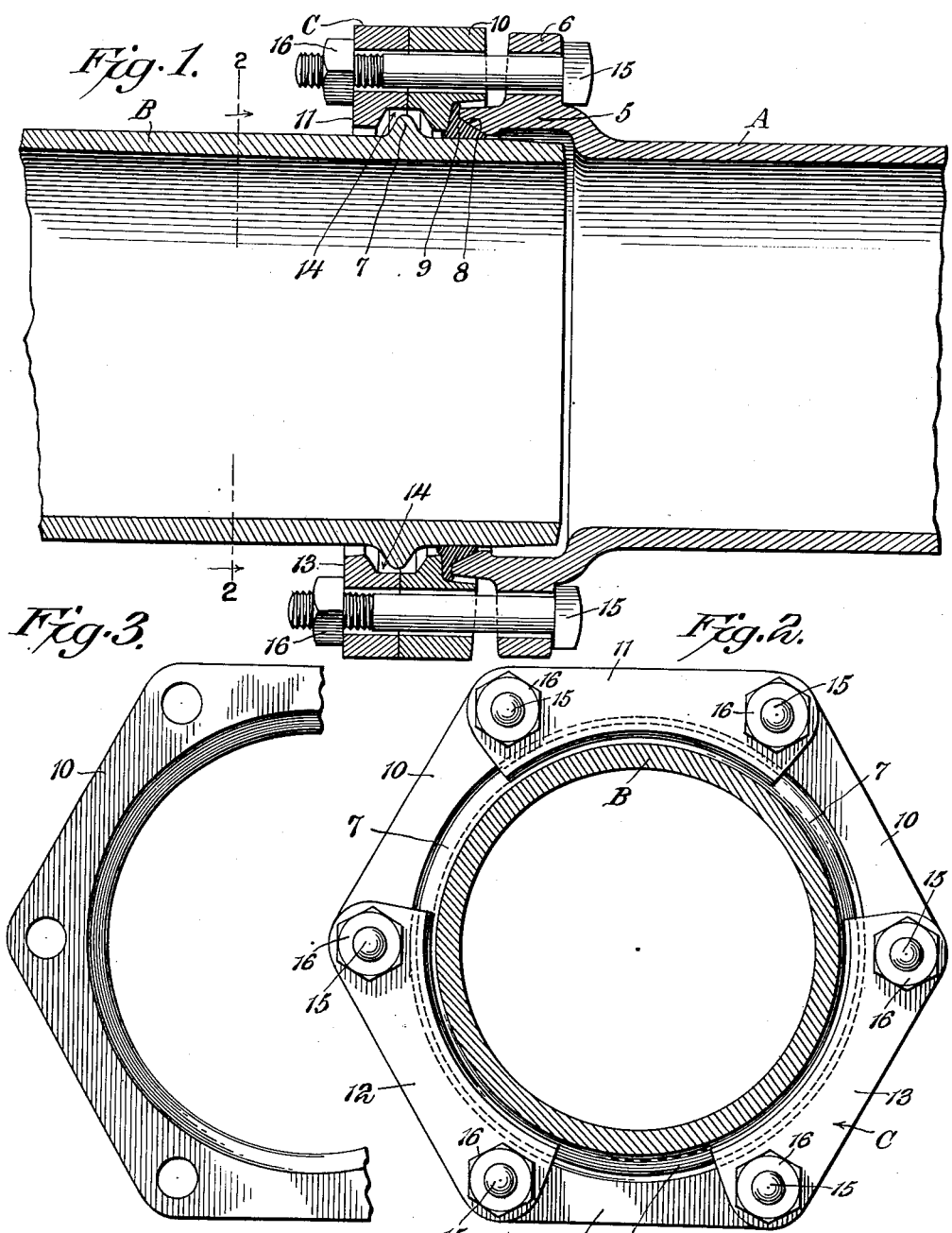

2,009,650

UNITED STATES PATENT OFFICE 2,009,650

PIPE JOINT

Arthur W. Claussen and Henry G. Floyd, Birmingham, Ala., assignors to McWane Cast Iron Pipe Co., Birmingham, Ala.

Application October 12, 1934, Serial No. 748,145

4 Claims. (Cl. 285—135)

This invention relates to new and useful improvements in pipe joints generally, although more particularly to pipe joints of the bell and spigot type.

The principal object of the invention is to provide a flexible joint for bell and spigot pipes which allows for longitudinal expansion and contraction as well as lateral deflection between the connected pipes, but which cannot be pulled or blown apart.

Another object of the invention is to construct such a joint with a minimum number of parts, to thereby provide a simple construction and one which is cheap to manufacture.

With these and other objects in view which will more fully appear, the nature of the invention will be more clearly understood by following the description, the appended claims, and the several views illustrated in the accompanying drawing.

In the drawing:—

Figure 1 is a longitudinal sectional view of a pipe joint constructed in accordance with the invention, Figure 2 is a transverse section taken on the line 2—2 of Figure 1, and Figure 3 is a partial side elevation of the movable ring.

Like reference numerals designate corresponding parts throughout the several figures of the drawing.

The invention includes a pipe section A having a bell 5 for receiving the spigot end of a pipe section B. Integral with the bell 5 is a flange or ring 6, and integral with the spigot is an outwardly extending circumferential rib 7 which is spaced from the end of the bell. The outer end of the bell is flared as at 8 to receive a compressible gasket 9. A movable ring 10 surrounds the spigot B and is located between the rib 7 and the gasket 9. The inside diameter of the movable ring is less than the outside diameter of the rib. A sectional ring C, which in this instance, is formed of three sections 11, 12 and 13, surrounds the spigot B on the side of the rib 7 opposite the movable ring 10. The movable ring and the sectional ring are conjointly formed with an annular groove 14 for receiving the rib 7. The inside diameter of the groove is greater than the outside diameter of the rib, the inside diameter of the sectional ring is less than the outside diameter of the rib, and the width of the groove is greater than that of the rib. The three rings 6, 10 and C are clamped together, with the gasket 9 between the rings 6 and 10, by a plurality of bolts 15 which pass through alined openings formed in the rings, and cooperating nuts 16.

From the foregoing, it will be observed that by reason of the relatively wide groove 14 and the relatively narrow rib 7 the joint will permit of longitudinal expansion and contraction between the pipe sections; that any tendency of the pipe sections to separate will be stopped by the rib 7 contacting the sectional ring C; that said contact is a line contact throughout the combined lengths of the ring sections 11, 12 and 13 and consequently the ring affords a substantial abutment; that the joint will permit of lateral deflection between the pipe sections which is essential when the pipe line follows the contour of a river bottom, the fulcrum being located at the gasket and the clearance between the periphery of the rib 7 and the groove 14 allowing for said deflection; that the joint may be readily assembled or disassembled, and that the joint is not only cheap to manufacture by reason of its simplicity but is also durable in operation.

We claim:—

1. A joint for pipes of the bell and spigot type comprising a fixed ring on the outer end of the bell, a movable ring on the spigot, a compressible gasket between the rings, a circumferential rib spaced beyond the gasket and extending outwardly from and integral with the spigot, a sectional ring abutting the outer face of the movable ring and having an inside diameter less than the outside diameter of the rib, said movable and sectional rings being spaced from the rib, and clamping bolts connecting all of said rings.

2. A joint for pipes of the bell and spigot type comprising a fixed ring on the outer end of the bell, a movable ring on the spigot, a compressible gasket between the rings, a circumferential rib spaced beyond the gasket and extending outwardly from and integral with the spigot, a sectional ring abutting the outer face of the movable ring and having an inside diameter less than the outside diameter of the rib, said movable and sectional rings being conjointly formed with a circumferential groove for receiving said rib, and clamping bolts connecting all of said rings.

3. A joint for pipes of the bell and spigot type comprising a fixed ring on the outer end of the bell, a movable ring on the spigot, a compressible gasket between the rings, a circumferential rib spaced beyond the gasket and extending outwardly from and integral with the spigot, a sectional ring abutting the outer face of the movable ring and having an inside diameter less than the outside diameter of the rib, said movable and sectional rings being spaced from the rib and conjointly formed with a circumferential groove for receiving said rib, and clamping bolts connecting all of said rings.

4. A joint for pipes of the bell and spigot type comprising a fixed ring on the outer end of the bell, a movable ring on the spigot, a compressible gasket between the rings, a circumferential rib spaced beyond the gasket and extending outwardly from and integral with the spigot, a sectional ring abutting the outer face of the movable ring and having an inside diameter less than the outside diameter of the rib, said movable and sectional rings being spaced from the rib and conjointly formed with a circumferential groove for receiving said rib, the inside diameter of the groove being greater than the outside diameter of the rib and the width of the groove being greater than the width of the rib, and clamping bolts connecting all of said rings.

ARTHUR W. CLAUSSEN.
HENRY G. FLOYD.